United States Patent [19]

Hsu

[11] Patent Number: 5,478,241
[45] Date of Patent: Dec. 26, 1995

[54] METHOD AND SYSTEM FOR AUTOMATICALLY DEMONSTRATING THE EFFECTIVENESS OF AN EYE PROTECTION SCREEN

[76] Inventor: Yen-Fun Hsu, 1F & 2F No. 42 Kwanghwa N. Street, Hsinchu City, Taiwan

[21] Appl. No.: 124,104

[22] Filed: Sep. 20, 1993

[51] Int. Cl.⁶ .................................................. G09B 25/00
[52] U.S. Cl. .......................... 434/379; 434/365; 359/601; 359/889
[58] Field of Search ..................... 434/365, 366, 434/379, 427, 428; 359/889, 892, 601

[56] References Cited

U.S. PATENT DOCUMENTS

| 2,931,856 | 4/1960 | Davis et al. | 359/889 |
| 4,528,685 | 7/1985 | Kump et al. | 359/889 |
| 4,652,085 | 3/1987 | Selling | 359/892 |
| 4,974,937 | 12/1990 | Haigo et al. | 359/889 |
| 5,070,407 | 12/1991 | Wheeler et al. | 359/889 |
| 5,155,627 | 10/1992 | Keehn et al. | 359/601 |

FOREIGN PATENT DOCUMENTS 2200782   8/1988   United Kingdom ................ 434/428

*Primary Examiner*—Todd E. Manahan
*Attorney, Agent, or Firm*—Beveridge, DeGrandi, Weilacher & Young

[57] ABSTRACT

An automatic demonstration system for showing the effectiveness and advantage of a particular eye protection screen to be promoted includes an actuation device for moving the eye protection screen between a position for shielding a cathode ray tube (CRT) display and a position for exposing the CRT display under the control of a control device. An oscilloscope having a probe is provided to detect the intensity of electromagnetic radiation from the CRT display for the demonstration of the effectiveness of reducing the intensity of the radiation. An external light source is provided to project light onto the CRT display and/or the eye protection screen for the demonstration of the effectiveness of eliminating light reflection from the CRT display screen. An operation method associated with the system is also provided which includes repeatedly moving the eye protection screen between the positions of shielding and exposing the CRT display for demonstrating (1) display screen softness improved by the eye protection screen, (2) the reflection of light from the CRT display screen eliminated by the eye protection screen, and (3) radiation from the CRT display blocked and reduced by the eye protection screen. An indication device is also provided to indicate which demonstration is being carried out.

22 Claims, 2 Drawing Sheets

METHOD AND SYSTEM FOR AUTOMATICALLY DEMONSTRATING THE EFFECTIVENESS OF AN EYE PROTECTION SCREEN

FIELD OF THE INVENTION

The present invention relates generally to eye protection screens for filtering out electromagnetic radiation from cathode ray tube (CRT) displays, such as TV screen or computer monitors, and in particular to a method and a system associated therewith for automatically demonstrating the effectiveness of an eye protection screen to be promoted by intermittently moving the protection screen to shield the CRT display and comparing the measured radiation strength between shielded and un-shielded conditions.

BACKGROUND OF THE INVENTION

Television screens and computer monitors generate and project out electromagnetic radiation during operation. Such electromagnetic radiation is of no immediate danger to the human body, but for those exposed to electromagnetic radiation over a long term, potential harm is expected, especially for eyes that are directly exposed to the electromagnetic radiation.

The potential danger of the CRT display is in general results from the intensive light projected out from the CRT display screen, reflectance of environment light or view from the CRT display screen, electromagnetic radiation of the CRT display and, static electricity on the CRT display screen. These factors have been reported to be dangerous and harmful to the human body, particularly the eyes.

To protect human body from the radiation damage of the CRT display, various kinds of protection screens for shielding the CRT display screen and filtering out radiation or reducing the intensity of light projected out of the CRT display screen have been developed and are available in the market.

However, since the human body and eyes are not very sensitive to the above-mentioned radiation or physical phenomenons, it is very difficult for an eye protection screen manufacturer or salesperson to show or demonstrate the effectiveness of the eye protection screen which they manufacture or promote.

It is therefore desirable to provide a method to help demonstrate the effectiveness of an eye protection screen to be promoted by automatically providing a comparison of the intensity of electromagnetic radiation and other major factors between the CRT screen in shielded and unshielded conditions.

SUMMARY OF THE INVENTION

It is the principal objective of the present invention to provide an automatic eye protection screen demonstration system which comprises an actuation device for moving the eye protection screen to be promoted back and forth for intermittently shielding the CRT display to provide a comparison between using and not using the eye protection screen.

It is also an objective of the present invention to provide a method for carrying out a series of demonstrations of the effectiveness of the eye protection screen with the automatic demonstration system of the present invention for showing the advantage of the eye protection screen so as to promote the sale of the eye protection screen.

To achieve the above objectives, there is provided an automatic demonstration system for showing the effectiveness and advantage of a particular eye protection screen to be promoted comprising an actuation device for moving the eye protection screen between a position for shielding a cathode ray tube display and a position for exposing the CRT display under the control of a control device. An oscilloscope having a probe connected thereto is provided to detect the intensity of electromagnetic radiation from the CRT display for the demonstration of the effectiveness of reducing the intensity of the radiation. An external light source is provided to project light onto the CRT display and/or the eye protection screen for the demonstration of the effectiveness of eliminating light reflection from the CRT display screen. An operation method associated with the system is also provided which includes repeatedly moving the eye protection screen between the positions of shielding and exposing the CRT display for demonstrating (1) display screen softness improved by the eye protection screen, (2) the reflection of light from the CRT display screen eliminated by the eye protection screen, and (3) radiation from the CRT display blocked and reduced by the eye protection screen. An indication device is also provided to indicate which demonstration is being carried out.

BRIEF DESCRIPTION OF THE DRAWING

The present invention will be better understood from the following description of a preferred embodiment of the present invention with reference to the attached drawings, wherein.

DETAILED DESCRIPTION OF THE PREFERRED EMBODIMENT

Figure 1:
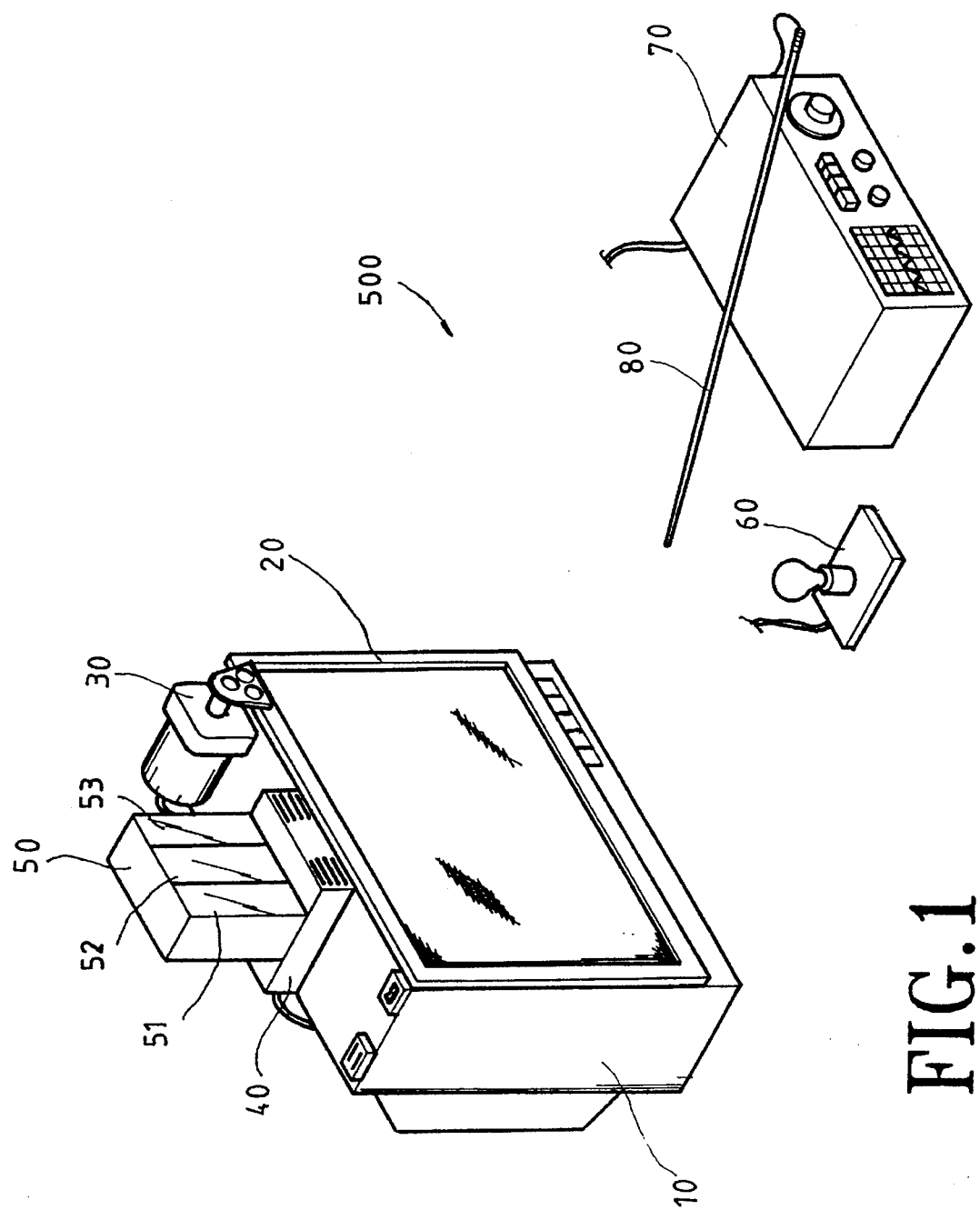
FIG. 1 is an isometric view showing an automatic demonstration system constructed in accordance with the present invention.

With reference to FIG. 1, wherein an automatic eye protection screen demonstration system constructed in accordance with the present invention, generally designated by the reference numeral 500 is shown, the automatic demonstration system 500 comprises an eye protection screen 20 movably mounted in front of the display screen of a CRT device, such as a television (TV) set 10. Means, such as an electrical motor 30, is fixed on the television set 10 for moving the eye protection screen 20 relative to the TV screen between a first position where the TV screen is shielded by the eye protection screen 20 and a second position where the TV display screen is not shielded and exposed. Control means 40, such as a control circuit, is provided to control the motion of the motor 30 and the system 500.

Indication means 50, such as light indicators 51, 52 and 53 are provided to indicate the demonstration item which is being exercised by the automatic demonstration system 500 of the present invention. Although there are three light indicators 51–53 shown in the embodiment, representing three different demonstration items, it is possible, if desired, to increase or decrease the total number of demonstration items and thus the number of the corresponding light indicators.

According to an aspect of the present invention, the three demonstrations of the embodiment include (1) display screen softness enhanced demonstration, (2) reflection elimination demonstration, and (3) electromagnetic radiation reduction demonstration, each demonstration associated with one of the light indicators 51–53. Under the control of the control means 40, each time when one of these demonstrations is carried out, the corresponding light indicator 51, 52 or 53 is lit and flashes.

For carrying out reflection elimination demonstration, an external light source, such as a light bulb 60, is provided, under the control of the control means 40, such that when the reflection elimination demonstration is exercised, the control means 40 turns on the light bulb 60 to project light onto the eye protection screen 20 and/or the TV screen.

For carrying out electromagnetic radiation reduction demonstration, an oscilloscope 70 with a probe 80 connected thereto is provided to detect the intensity of the electromagnetic radiation coming out from the TV screen. The oscilloscope 70 is also under the control of the control means 40 to cooperate with the indication means 50 and the motion of the motor 20 for detection of the electromagnetic radiation.

Figure 2:
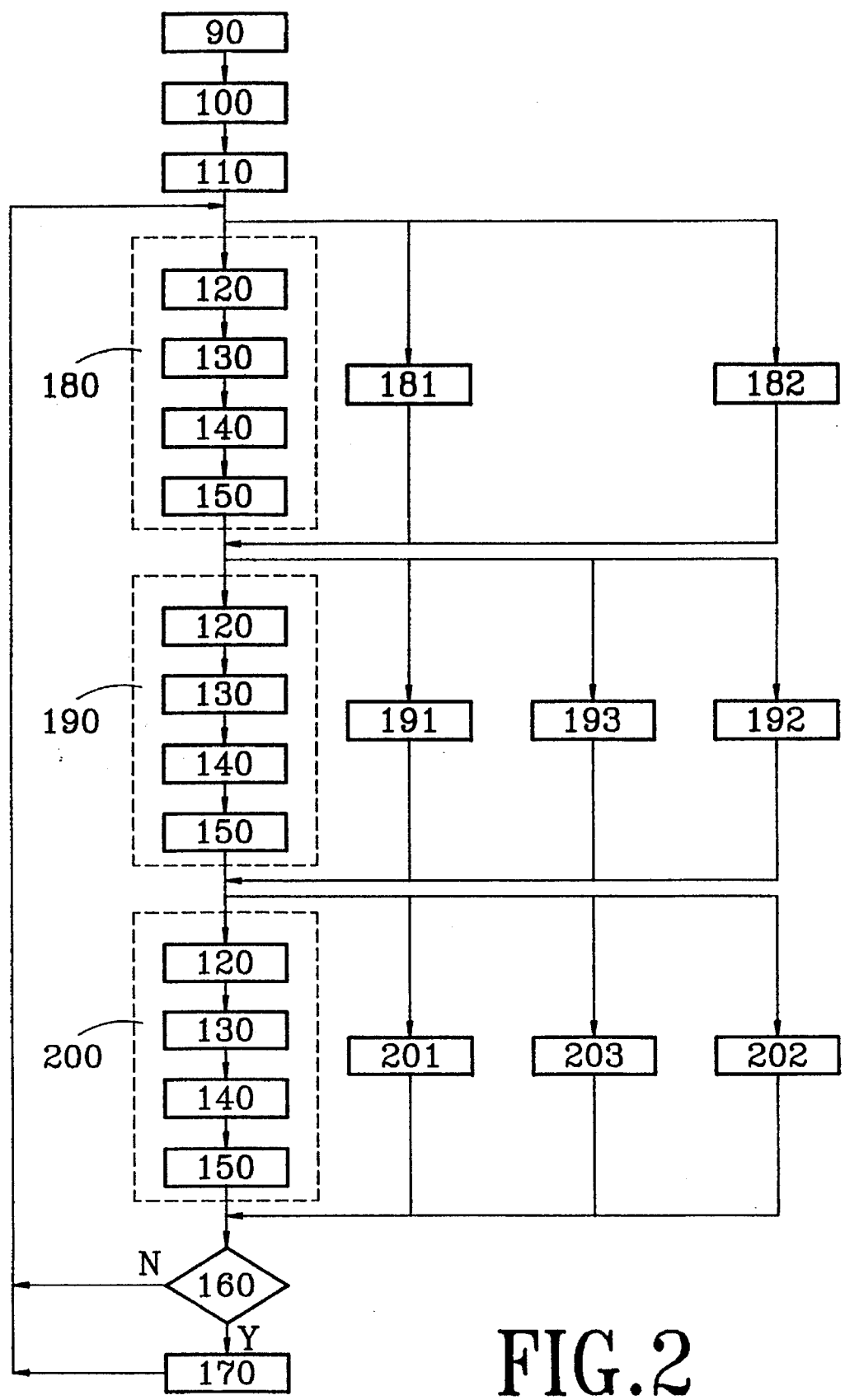
FIG. 2 is a flow chart showing the method for operating the system of FIG. 1.

With reference to FIG. 2 wherein a flow chart showing the operation of the automatic demonstration system 500 shown in FIG. 1 is illustrated, the operation of the automatic demonstration system 500 starts with powering on the system 500, step 90, turning on the television set 10 and the associated device, if any, step 100, and turning on the control means 40, step 110. If a video cassette recorder (VCR) is used to provide a picture or program to the television set 10, then in step 100, the VCR is turned on too.

Once the whole system 500 is initialized, the control means 40 automatically controls the system 500 to enter a first demonstration mode 180, such as display screen softness enhanced demonstration, wherein the first light indicator 51 is turned on to flash at 181 and the TV 10 and VCR are maintained active at 182 to play back the program(s) recorded on a video cassette. Also in the first mode 180, the motor 30 is activated to move the eye protection screen 20 to the first position to shield the TV screen for a first time period, step 120, and the eye protection screen 20 is then removed to expose the TV screen for a second time period, step 130. Thereafter, the shielding and unshielding cycle of the TV screen is repeated one more time, steps 140 and 150.

Preferably, the first time period is longer than the second time period, for example, the first time period is 30 seconds and the second time period 20 seconds. By repeatedly shielding and exposing the TV screen, a comparison between using and not using the eye protection screen can be obtained, and this gives a consumer who is watching the demonstration quite an impression regarding the effectiveness of the eye protection screen to be promoted in enhancing the screen softness of the TV screen.

Once the first demonstration mode 180 is completed, the control means 40 automatically enters a second demonstration mode 190 which is the reflection elimination demonstration. In this second mode 190, the first light indicator 51 is turned off and the second light indicator 52 is turned on instead, step 191, the TV and VCR are maintained active at 192, and the external light source 60 powered on, step 193.

In the second demonstration mode 190, the shielding and exposing cycle of the TV screen, steps 120–150, is exercised again to demonstrate the effectiveness of the eye protection screen 20 in eliminating light reflection by repeatedly shielding and exposing the TV screen to allow a watcher to see the difference between using and not using the eye protection screen 20.

Thereafter, the system 500 will automatically enter a third demonstration mode 200 under the control of the control means 40. In the embodiment illustrated, the third demonstration mode 200 is for demonstrating the effectiveness of the eye protection screen 20 in blocking and reducing electromagnetic radiation from the TV screen.

In the third demonstration mode 200, the control means 40 turns off the second light indicator 52 and turns on the third light indicators 53 at 201. The control means 40 further maintains the TV and VCR active at 202, turns off the external light source 60 and turns on the oscilloscope 70 at 203. Meanwhile, the motor 30 is also controlled to carry out the display screen shielding and exposing cycle, steps 120–150. By repeatedly shielding and exposing the TV screen, the consumer can observe from the oscilloscope 70 how the radiation intensity from the TV screen is reduced by the eye protection screen 20.

When all the demonstration modes 180, 190 and 200 are all completed, the control means 40 will check if the program tape for playing back in the VCR is ended, step 160. If not, the system 500 will return to first demonstration mode 180 to repeat in sequence the first, second and third demonstration modes 180, 190 and 200. If the tape is ended, then the control means 40 rewinds the tape at step 170 and then returns back to the first demonstration mode 180 again.

The demonstration cycle will be cyclically repeated until the system 500 is shut down.

With the vivid demonstrations provided by the present invention as described hereinbefore, it is quite apparent that the manufacturer or salesperson can easily demonstrate to the general consumers the advantage of the eye protection screen 20 which they manufacture or sell and this, as compared with the conventional conversation type sale strategy, is quite an advanced way for promoting and selling eye protection screens.

It is apparent that although the invention has been described in connection with the preferred embodiment, it is contemplated that those having ordinary skill may make changes and modifications to the system and the demonstration process described herein without departing from the spirit and scope of the invention as defined in the appended claims.

What is claimed is:

1. A system for automatically demonstrating effectiveness of an eye protection screen, comprising:

a cathode ray tube display screen;

an eye protection screen movably disposed in front of the cathode ray tube display screen to shield the cathode ray tube display screen;

a program source for providing a program to play in the cathode ray tube display;

actuation means for moving the eye protection screen between a first position where the eye protection screen is located in front of the cathode ray tube display screen to shield the display screen and a second position where the cathode ray tube display screen is not shielded by the eye protection screen and is thus exposed;

control means for controlling said actuation means to repeatedly move the eye protection screen between the first position and the second position in accordance with a demonstration procedure, on said indication means when the demonstration procedure is wherein the demonstration procedure includes at least a first demonstration mode; and an indication means including at least a first light indicator associated with the first demonstration mode, wherein said control means turns on said first light indicator when the first demonstration mode is initialized.

2. A system as claimed in claim 1, wherein said actuation means comprises a motor controlled by said control means.

3. A system as claimed in claim 1, further comprising an external light source for projecting light onto the cathode ray tube display screen and the eye protection screen, wherein during a second demonstration mode, the external light source is activated under the control of said control means, and wherein said indication means includes a second light indicator associated with the second demonstration mode.

4. A system as claimed in claim 3, wherein said external light source is a light bulb controlled by said control means.

5. A system as claimed in claim 1, further comprising detection means for detecting a physical quantity generated by the cathode ray tube display screen, wherein the demonstration procedure includes a second demonstration mode, wherein during the second demonstration mode the detection means is activated under the control of the control means, and wherein said indication means includes a second light indicator associated with the second demonstration mode.

6. A system as claimed in claim 5, wherein said physical quantity detected by the detection means includes detection of electromagnetic radiation, and wherein said detection means includes an oscilloscope having a probe connected thereto for detecting the electromagnetic radiation from the cathode ray tube display screen.

7. A method for automatically demonstrating effectiveness of an eye protection screen with an automatic demonstration system, in which system, said eye protection screen is disposed in front of a display screen of a cathode ray tube display means which receives and displays a program from a program source, said eye protection screen provided for shielding the display screen of the cathode ray tube display means and is movable by an actuation means under the control of a control means between a first position where the display screen of the cathode ray tube display means is shielded by the eye protection screen and a second position where the display screen of the cathode ray tube display means is not shielded by the eye protection screen and is exposed, said system further including an indication means having at least a first light indicator controlled by said control means, said method comprising the following steps:

(A) actuating the cathode ray tube display means to show the program on the display screen thereof;

(B) powering on the automatic demonstration system to actuate the control means;

(C) initializing a demonstration cycle which includes at least a first demonstration mode, which first demonstration mode includes the following steps:

(1) turning on the first light indicator of said indication means to indicate that the first demonstration mode is on;

(2) moving the eye protection screen to the first position to shield the display screen for a first time period;

(3) moving the eye protection screen to the second position to expose the display screen for a second time period; and (4) repeating steps (2) and (3) for at least one more time; and (D) repeating the demonstration cycle until the automatic demonstration system is shut down.

8. A method as claimed in claim 7, wherein said demonstration cycle further comprises a second demonstration mode to be carried out after the first demonstration mode, said second demonstration mode comprising the following steps:

(1') turning on a second light indicator of said indication means to indicate that the second demonstration mode is on;

(2') using an external light source to project light onto the display screen and allowing the light to be reflected therefrom;

(3') moving the eye protection screen to the first position to shield the display screen for a first time period;

(4') moving the eye protection screen to the second position to expose the display screen for a second time period;

(5') repeating steps (3') and (4') for at least one more time.

9. A method as claimed in claim 8, wherein said demonstration cycle further comprises a third demonstration mode to be carried out after the first and the second demonstration modes, said third demonstration mode comprising the following steps:

(1") turning on a third light indicator of said indication means to indicate that the third demonstration mode is on;

(2") actuating detection means for detecting a physical quantity generated by the cathode ray tube display means;

(3") moving the eye protection screen to the first position to shield the display screen for a first time period to block the physical quantity transmitted out of the CRT display means;

(4") moving the eye protection screen to the second position to expose the display screen for a second time period;

(5") repeating steps (3") and (4") for at least one more time.

10. A method as claimed in claim 9, wherein said physical quantity includes electromagnetic radiation and wherein said detection means includes an oscilloscope having a probe connected thereto for detecting the electromagnetic radiation from the cathode ray tube display means.

11. A method as claimed in claim 7, wherein said first time period is longer than said second time period.

12. A method as claimed in claim 11, wherein said first time period is 30 seconds and said second time period is 20 seconds.

13. A device for automatically demonstrating effectiveness of an eye protection screen, comprising:

actuation means for moving an eye protection screen between a first position where an eye protection screen is located in front of a display screen to shield a display screen and a second position where an eye protection screen is located away from a display screen;

control means for controlling the actuation means to repeatedly move an eye protection screen between the first position and the second position in accordance with a demonstration procedure, wherein the demonstration procedure includes at least a first demonstration mode; and an indication means including at least a first light indicator associated with the first demonstration mode, wherein the control means turns on said first light indicator when the first demonstration mode is initialized.

14. A device as claimed in claim 13, wherein said actuation means comprises a motor controlled by said control means.

15. A device as claimed in claim 13, further comprising an external light source for projecting light onto a display screen and an eye protection screen, wherein during a second demonstration mode, the external light source is activated under the control of the control means, and wherein said indication means includes a second light indicator associated with the second demonstration mode, wherein the control means turns on the second light indicator when the second demonstration mode is initialized.

16. A device as claimed in claim 15, further comprising detection means for detecting a physical quantity generated by a display screen, wherein the demonstration procedure includes a third demonstration mode, wherein during the third demonstration mode, the detection means is activated under the control of the control means, and wherein said indication means includes a third light indicator associated with the third demonstration mode, wherein the control means turns on the third light indicator when the third demonstration mode is initialized.

17. A device as claimed in claim 16, wherein said physical quantity detected by the detection means includes detection of electromagnetic radiation, and wherein said detection means includes an oscilloscope having a probe connected thereto for detecting the electromagnetic radiation from a display screen.

18. A device as claimed in claim 13, further comprising detection means for detecting a physical quantity generated by a display screen, wherein the demonstration procedure includes a second demonstration mode, wherein during the second demonstration mode the detection means is activated under the control of the control means, and wherein said indication means includes a second light indicator associated with the second demonstration mode, wherein the control means turns on the second light indicator when the second demonstration mode is initialized.

19. A device as claimed in claim 18, wherein said physical quantity detected by the detection means includes detection of electromagnetic radiation, and wherein said detection means includes an oscilloscope having a probe connected thereto for detecting the electromagnetic radiation from a display screen.

20. A device as claimed in claim 13, further including a program source for providing a program to play on a display screen.

21. A device as claimed in claim 13, further including an eye protection screen connected to the actuation means.

22. A device as claimed in claim 13, further including a cathode ray tube display including a display screen positioned adjacent the first position of the actuation means.

* * * * *